K. DE KANDO.
ELECTRIC TRACTION SYSTEM AND MOTOR TO BE USED THEREWITH.
APPLICATION FILED MAY 25, 1905.
1,050,468.
Patented Jan. 14, 1913.
4 SHEETS—SHEET 1.
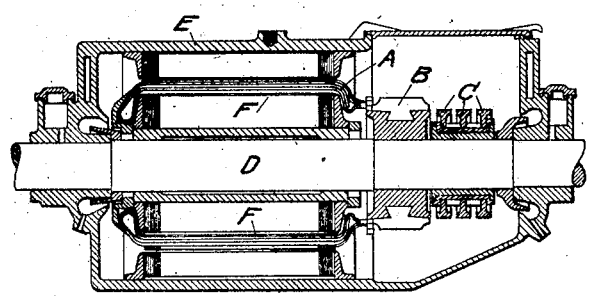
Fig. 1.
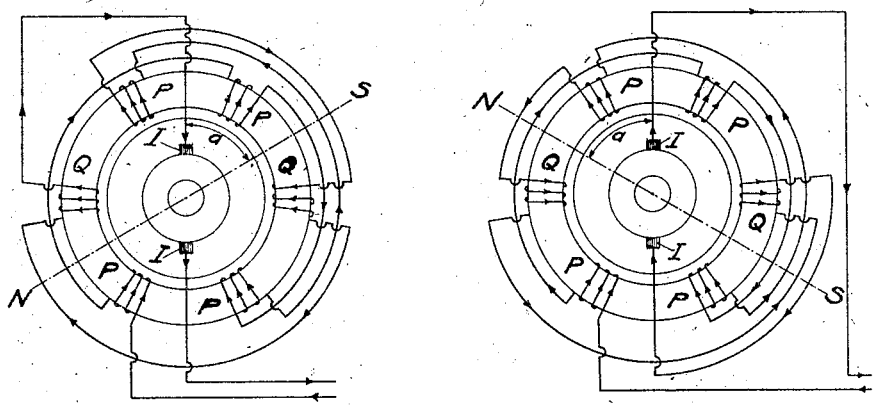
Fig. 8.
Fig. 9.
WITNESSES:
INVENTOR
BY Kolowan de Kando
HIS ATTORNEY IN FACT.

K. DE KANDO.
ELECTRIC TRACTION SYSTEM AND MOTOR TO BE USED THEREWITH.
APPLICATION FILED MAY 25, 1905.

1,050,468.

Patented Jan. 14, 1913.

4 SHEETS—SHEET 2.

WITNESSES:
Robert Head
P. B. Cavanagh

INVENTOR
Koloman de Kando
BY
Gifford Pree
ATTORNEYS

UNITED STATES PATENT OFFICE.

KOLOMAN DE KANDO, OF BUDAPEST, AUSTRIA-HUNGARY, ASSIGNOR, BY MESNE ASSIGNMENTS, TO WESTINGHOUSE MACHINE COMPANY, A CORPORATION OF PENNSYLVANIA.

ELECTRIC TRACTION SYSTEM AND MOTOR TO BE USED THEREWITH.

1,050,468.  Specification of Letters Patent.  Patented Jan. 14, 1913.

Application filed May 25, 1905. Serial No. 262,258.

*To all whom it may concern:*

Be it known that I, KOLOMAN DE KANDO, a citizen of the Kingdom of Hungary, residing in Budapest, Austria-Hungary, have invented certain new and useful Improvements in Electric Traction Systems and Motors to be Used Therewith, of which the following is a specification.

Direct currents of comparatively low voltage, either generated as such or converted from alternating currents, are generally employed for traction purposes and under certain conditions possess advantages over the direct use of polyphase currents in the contact conductors. On the other hand, a system involving the direct use of polyphase currents in the contact conductors over lines of considerable length can be installed at less cost and is more economical in operation, but it has had the disadvantage that cars equipped for it heretofore could not run on lines using direct or single-phase alternating current in the contact conductors without duplication of apparatus, because a motor capable of operating efficiently as a direct-current motor and also as a polyphase motor had not heretofore been invented.

The introduction of such a motor constitutes, therefore, an important advance in the art and is, among other things, the subject of my present invention.

My invention also comprises a traction system having contact conductors supplied in part with direct or single-phase currents and in part with polyphase currents, with vehicles equipped with motors having the capability of operating with both varieties of current supply.

In the accompanying drawings I have shown diagrammatically my invention embodied in several forms which are at present preferred by me, but it will be understood that various modifications and changes may be made in the structures hereinafter described without departing from the spirit of my invention and without exceeding the scope of my claims.

Figure 6:
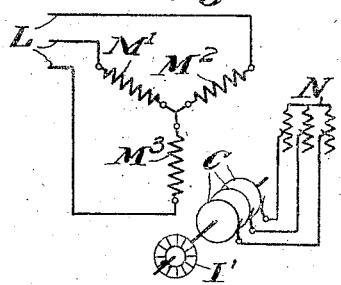
Figure 7:
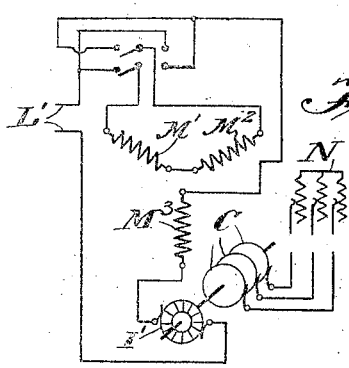
Figure 10:
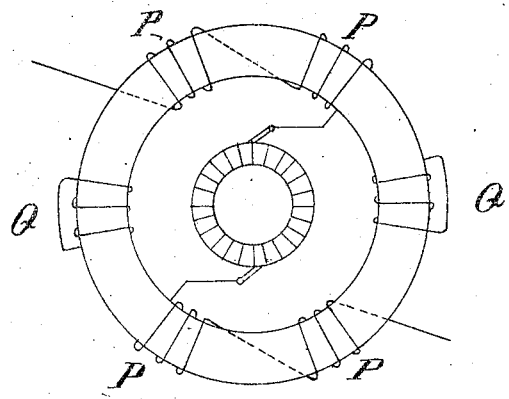
Figure 11:
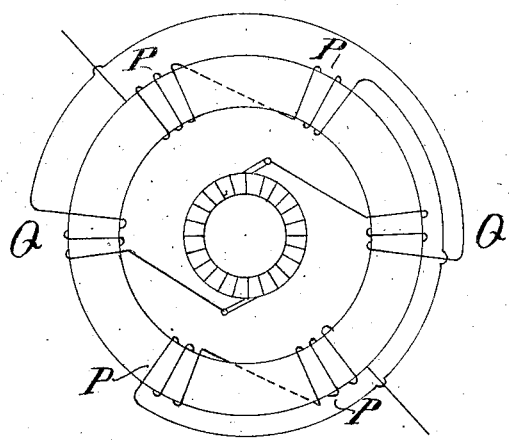
Figure 12:
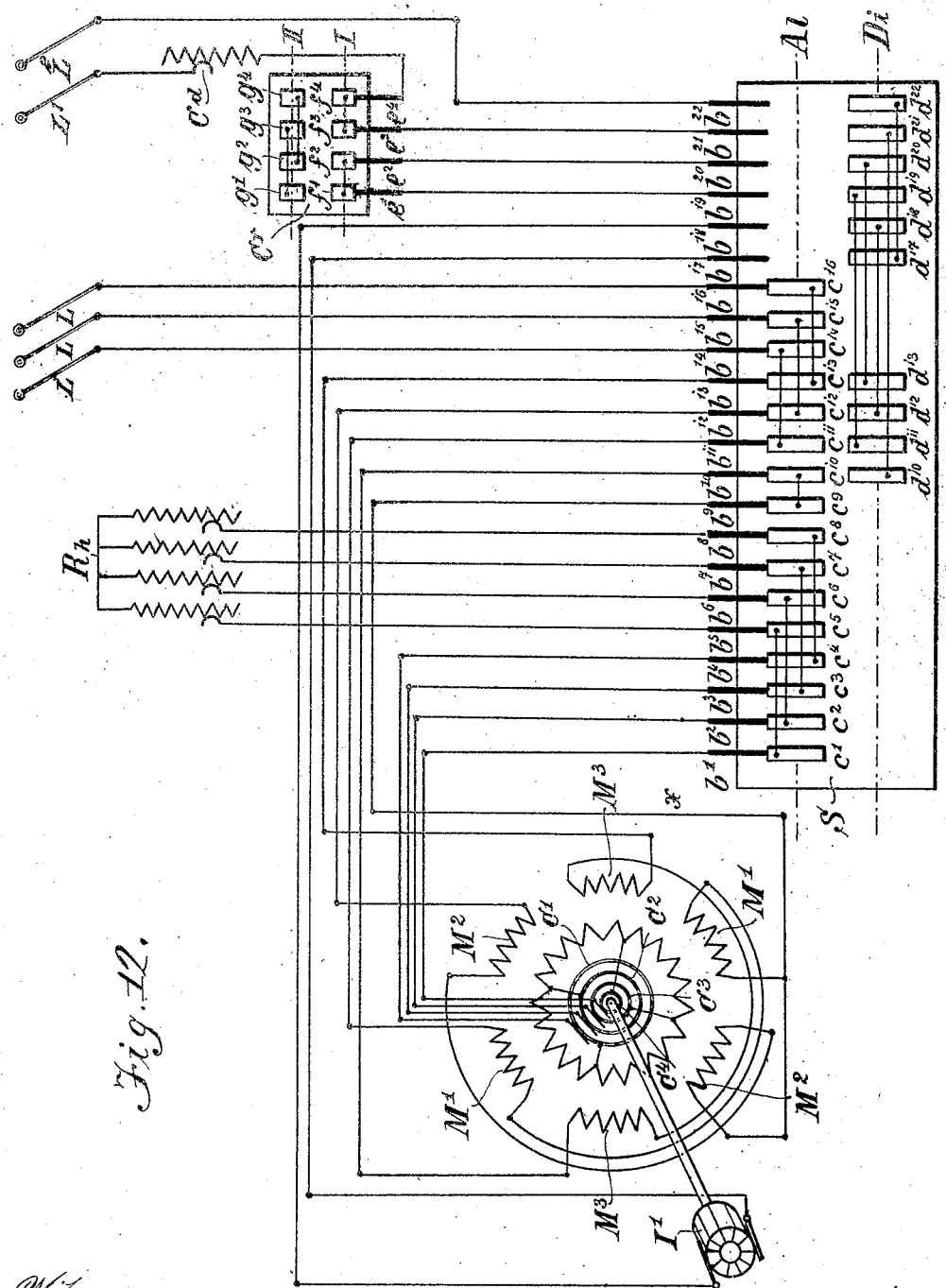

In the drawings: Figure 1 is a longitudinal section through a rotor showing the manner of mounting the commutator and the collector rings; Figs. 2, 3, 4 and 5 diagrammatically illustrate rotor windings; Figs. 6 and 7 diagrammatically illustrate the manner in which the coils of the rotor and stator may be connected, in one case to receive polyphase currents and in the other case to receive direct or single phase currents. Figs. 8 and 9 diagrammatically illustrate forms of stator windings. Figs. 10 and 11 show modified connections for single-phase operation. Fig. 12 illustrates more in detail the switches and their connections.

Similar letters and numerals of reference indicate the same or corresponding parts in the various figures.

The result aimed at by my invention may be attained, generally speaking, by providing a motor with suitable windings on its stator and rotor elements, capable of being so changed at pleasure as to form at one time the primary and secondary elements of a polyphase induction motor, and to form at another time the field and armature of a series commutator motor, with a switch by means of which the desired changes can be readily effected.

The following is a description of the structures diagrammatically shown in the accompanying drawings, which structures are given here merely as examples of structures and systems embodying my invention in forms at present preferred by me, but as in no sense limiting my claims to the specific details illustrated and described.

Referring to Fig. 1, A is the rotor of an electric motor mounted on shaft D and carrying inlaid coils F that is, laid into slots in the core, as shown.

B is a commutator mounted on the shaft D to which said coils are attached in the ordinary way, and C are collector rings, also mounted on said shaft, and suitably connected with said coils in such manner that the required tension for three alternating current phases is established between the contact rings. In Fig. 1 the commutator and contact rings are both shown inside the motor housing on one end of the rotor, but various other ways of providing the rotor with both a commutator and collector rings might be adopted and the contact rings might, if desired, be placed between the rotor and the commutator; but such construction is less desirable as the numerous commutator connections would have to pass through the contact rings.

Figure 2:
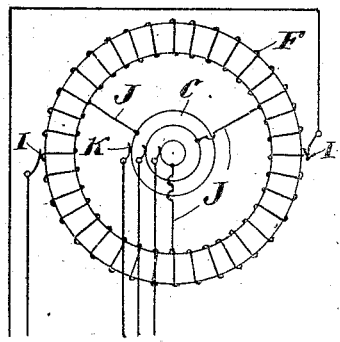
Figure 3:
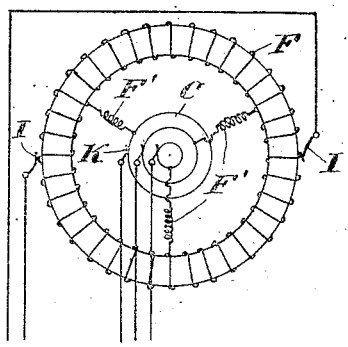
Figure 4:
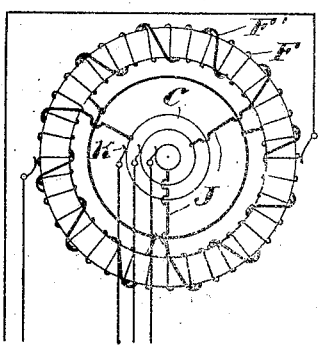
Figure 5:
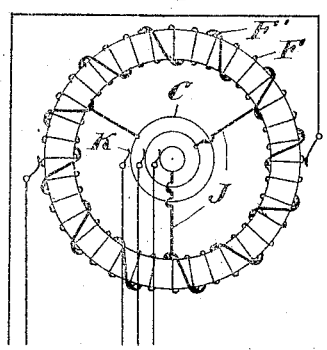

In Fig. 2 I have shown diagrammatically a rotor having a continuous winding connected with commutator and contact brushes I, I, and also with three phase connections J, J, J, leading to contact rings C and contact brushes K. In Fig. 3 I have shown a similar arrangement of parts in which the polyphase winding is provided with additional coils F' suitably disposed. Such additional coils may be used for the adaptation of the winding to the desired voltage either as primary or secondary of the induction motor or for securing any desired flux distribution in the air gap or for other purposes such as a means of varying the resistance or reactance of the polyphase winding. In either case the motor may be adapted to operate with direct or single-phase currents of one voltage and with polyphase currents of different voltage by properly determining the ratio of transformation when in polyphase connection and the field strength and number of conductors per pole to give the correct speed on a circuit of the desired voltage when in series connection through the commutator. Instead of using, in whole or in part, the same windings on the rotor for commutated currents and also for polyphase currents, I may employ separate windings for these currents, as diagrammatically illustrated in Figs. 4 and 5, in which F are the coils connected with the commutator and employed for direct or single phase currents, and F' are the coils connected with the collector rings C and used solely for polyphase currents. In Fig. 4 the three-phase winding is shown for star connection while in Fig. 5 it is shown for delta connection. In the case of single-phase alternating current operation, higher resistance leads to the commutator may be employed, either laid in the winding slots, or otherwise disposed, although this is not necessary.

In order to provide a structure capable of operating as a satisfactory and efficient induction motor, it is desirable to employ poleless stator and rotor elements with a small air gap between them and with windings located in slots in the opposing surfaces of said elements. Such a structure, however, when operated as a series motor with a stationary, instead of a rotating, magnetic field in its stator, and a commutated armature, having poles fixed by the location of the brushes, is unfavorable, particularly if the armature magnetization is strong, because of the powerful cross-magnetizing effect of the armature. In this invention a very superior series machine is nevertheless formed of such device by employing a portion of the windings of the induction motor (as, for instance, all or part of the windings constituting one or more of the phases thereof) reversely connected with reference to the armature to neutralize the cross-magnetizing effect; and these I call neutralizing or compensating coils. By this means superior commutation is secured for direct current or single-phase alternating current operation in a machine designed in all respects for advantageous operation as a polyphase induction motor. Stator windings suitable for the purpose in view are diagrammatically shown in Figs. 8 and 9, the example given being for a three-phase winding. In this arrangement I preferably employ one or two of the phase windings for magnetizing coils, and correspondingly two or one of the phase windings as neutralizing coils, reversely connected so as to neutralize armature reaction and improve commutation. In these figures the coils P, P, P, P may be regarded as the magnetizing coils, while the coils Q, Q, being reversely connected, may be regarded as neutralizing coils.

In the arrangement of circuits shown in Figs. 8 and 9, it will be observed that the magnetic poles developed, indicated by the dotted lines N—S, make an angle other than 90° with respect to the magnetic axis of the armature current. In Fig. 8, the motor is supposed to be rotating in one direction and in Fig. 9 it is supposed to be rotating in the opposite direction, the angle between the line N—S and the magnetic axis of the armature current being equal in both cases but of opposite values. When connected in this manner the motor is reversed by reversing the direction of the current through the magnetizing coils P, the direction of the current through the neutralizing coils Q and the armature remaining the same; or it may be reversed by reversing the direction of the current through the armature coils and simultaneously reversing the direction of the current through the neutralizing coils Q, the direction of the currents through the magnetizing coils P remaining unchanged, the result being in either case to make the magnet poles form an angle other than 90° with respect to the magnetic axis of the armature current, but pointing in the opposite direction, as shown by the dotted line N—S in Figs. 8 and 9, these figures showing the case in which the reversal is brought about by changing the direction of the currents in the neutralizing coils Q and in the armature circuits. In other words, neutralizing coils in series operation may be considered as a stationary part of the armature circuit and are to be reversed with the armature circuit when operating the reversing switch, or are to remain in the same relation to it while the remaining or magnetizing windings are reversed. This arrangement has great engineering advantages enabling the motor to give substantially perfect compensation with direct current and with single-phase alternating current.

While I have shown the magnetizing windings on the stator arranged in series when the motor is used for single-phase or direct current operation, it will, of course, be understood that these windings may be arranged in multiple or series-multiple relation and this might be advantageous in case the motor is designed to receive high voltage polyphase current. Furthermore when the motor is used for single phase current, the coils Q may be shortcircuited as shown in Fig. 10 or the armature may be short-circuited alone or in series with the coils Q as shown in Fig. 11, so that in this latter case the motor will act as of the repulsion type.

Figs. 6 and 7 show diagrammatically a motor involving my invention with its circuit connections changed so as to operate in one case as a polyphase motor, and in the other case as a series-commutator motor adapted to receive direct or single-phase alternating current. For the purpose of illustration, I have taken the example of a three-phase motor with star-connection winding, although any other number of phase or any other form of connection is adapted to my purpose. Referring to Fig. 6, showing the connection of circuits for multiphase operation, L, L, L, are three-phase transmission lines, and $M^1$, $M^2$, $M^3$, are the polyphase windings arranged, as I have said, for star connection. N is the secondary element, C, C, C, the collector rings and $I^1$ the commutator (out of action). Fig. 7 shows the same motor arranged for series commutated operation. L', L', are the single-phase or direct-current transmission lines, $M^1$, $M^2$, $M^3$ the windings of the stator, which now instead of being arranged for star connection, are shown as arranged in series among themselves and with the armature windings through the commutator $I^1$, the collector rings now being shown out of action. When switching from direct or single-phase currents to multiphase currents, or vice versa, it is only necessary, therefore, in principle, to change the connections of the windings of the stator and simultaneously connect or disconnect them from the windings of the rotor, alternately bringing into action and cutting out of action the commutator and the collector rings.

In practice if the coils $M^1$ $M^2$ are so disposed that the direction of the field induced by them is at right angles to the magnetic axis of the armature corresponding to the brush positions and the direction of the field induced by the coil $M^3$ is in line therewith, the coils $M^1$ $M^2$ are the magnetizing coils and the coil $M^3$ the compensating coil and vice versa. When reversal takes place in the apparatus illustrated in Fig. 7 either the field coils alone are reversed or the compensating coil and armature are reversed and the field or magnetizing coils remain unchanged. The former is shown for simplicity.

Referring to Fig. 12, M', $M^2$, $M^3$, represent the three phases of the stator windings of a motor, I' represents the commutator and C', $C^2$, $C^3$, $C^4$ represent collector rings of a two-phase winding (the connections between the commutator segments and the rotor winding being of the usual character and therefore not shown in detail). R$h$ represents a starting rheostat for the polyphase operation. L, L, L, represent traveling contact for contacting with three-phase transmission lines and L' $L^2$ similar contacts for single-phase or direct-current transmission lines. Cd is the direct-current controller represented diagrammatically by a regulating resistance and Cr is the reversing switch for direct-current operation. The stationary contacts of the main switch S are numbered from $b^1$ to $^{22}$ and the movable contacts from $d^{10}$ to $d^{13}$ and from $d^{17}$ to $d^{22}$. Position $A^1$ of the switch corresponds to alternating current and position D$i$ to direct-current operation. In the case here shown the phases M' and $M^2$ of the stator form the neutralizing circuits of the direct-current motor and the phase $M^3$ forms the magnetizing coil. In position D$i$ of the main switch S (viz: for direct-current operation) and position I of the reversing switch Cr, the current enters by lead $L^2$, brush $b^{22}$, contacts $d^{22}$ and $d^{17}$, brush $b^{17}$, commutator I', passing through the armature coils to brush $b^{18}$ contacts $d^{18}$ and $d^{12}$, brush $b^{12}$, field coils $M^2$, M' to brush $b^{11}$, contacts $d^{11}$ and $d^{19}$, brush $b^{19}$, to brush $e'$ of the reversing switch Cr contacts $f^1$ and $f^2$, brush $e^2$ to brush $b^{20}$ of the main switch S, contacts $d^{20}$ and $d^{13}$, brush $b^{13}$, field coils $M^3$, brush $b^{10}$, contacts $d^{10}$ and $d^{21}$, brush $b^{21}$ to brush $c^3$ of the reversing switch Cr contacts $f^3$ and $f^4$, brush $e^4$ through direct-current controller Cd to lead $L^1$. When the motor working with direct-current should be reversed the reversing switch Cr is brought into position II, thereby breaking the connections, respectively, between brushes $e^1$—$e^2$ and $e^3$ $e^4$ and connecting brush $e'$ with $e^3$ and brush $e^2$ with $e^4$. Thereby the direction of the current flowing through coils $M^3$ will be changed without altering the flow of the current in the other parts of the circuit. When the motor should be operated with alternating current, the main switch S is brought into such a position that the collector rings $C^1$, $C^2$, $C^3$, $C^4$ are connected by means of the brushes $b^1$, $b^2$, $b^3$, $b^4$, contacts $c^1$, $c^2$, $c^3$, $c^4$ and $c^5$, $c^6$, $c^7$, $c^8$, respectively, to brushes $b^5$, $b^6$, $b^7$, $b^8$ and to the starting rheostat, $Rh$, for the two-phase armature winding. The three phases of the stator are connected by means of brush $b^9$, contacts $c^9$ and $c^{10}$, and brush $b^{10}$ with each other so that the three phase current operation can be started. The current enters through the leads L, L, L, the brushes $b^{14}$, $b^{15}$, $b^{16}$, contacts $c^{14}$, $c^{15}$, $c^{16}$ and $c^{11}$, $c^{12}$, $c^{13}$, brushes $b^{11}$, $b^{12}$, $b^{13}$ to the ends of the three phases $M^1$, $M^2$, $M^3$ of the stator winding, the ends of the phases $M^1$ and $M^2$ being connected through lead $x$, brush $b^9$, contacts $c^9$ and $c^{10}$, brush $b^{10}$ with the end of the phase $M^3$.

A three-phase induction motor winding lends itself particularly well to the disassociation and reassembling above described and this I have, therefore, shown. The three-phase arrangement in the stator is not necessary, as by properly sub-dividing the windings for dis-association and reconnection a two-phase primary winding may be employed with the same advantageous results. In either case where it is desired, for the purpose of simplification of rheostat construction, or easier adaptation of windings for their dual purpose in the armature, the latter may be wound for two-phase current, for example. The transforming ratio between primary and secondary windings is made such that the desired secondary voltage applied at the terminals of the rheostat when starting as an induction motor is secured, while the electromotive force generated during operation as a series machine is that suitable for operation on the standard or desired single circuit voltage. By properly choosing the ratio of transformation the same rheostat may, if desired, be employed for both induction motor and series motor control and a common rheostat controller apparatus may also be employed. This arrangement offers great advantages in simplicity of train apparatus, particularly with multiple-unit train control operation.

In the foregoing description, I have referred to the stator as the primary of the polyphase motor and the field of the series commutator motor and I have referred to the rotor as the secondary of the polyphase motor and the armature of the series commutator motor; but it will be understood that these parts may be reversed in practice and, therefore, that the words rotor and stator are used in this relative sense and not in the literal sense in these specifications and in my claims. Indeed, it is obvious, for example, that the polyphase currents could as well be fed to the rotor as to the stator, in which case the former would constitute the primary and the latter the secondary of the motor.

While I have shown and described the single current commutator motor with its field and armature connected in series, which is the form I prefer, they might, in the broader aspects of my invention, if desired for any reason, be connected in multiple or compound relation.

In these specifications I have not shown or described the constructional details of the rotors or stators, nor of the windings, nor of the switches or rheostats, nor of the other elements of the motor or its connections or attachments, because these form no part of my present invention and because such details requisite to carry out my invention in practice are within the knowledge of those skilled in the art; and while I have described, incidentally, various modifications of my invention, I have not attempted to describe all the modifications which might be suggested. Many of the details and combinations illustrated and above described are not essential to the several features of my invention, broadly considered. This will be indicated in the concluding claims, where the omission in a claim of reference to an element described, or the omission of reference to the particular features of the elements mentioned, is intended to indicate that the omitted elements or features are not essential to the invention thereby covered.

Having thus described my invention in preferred forms, what I claim and desire to secure by these Letters-Patent, is:

1. In an electric motor the combination of a stator provided with windings and means for connecting said windings in polyphase relation to constitute the primary of a polyphase motor, and also in single-phase or direct current relation to constitute the field of a single phase or direct current motor, and a rotor provided with windings connected in polyphase relation to constitute the secondary of a polyphase motor, and a commutator and brushes adapted to connect the windings of the stator with the windings of the rotor to constitute the armature of a single-phase or direct current series motor.

2. In an electric motor disassociable stator windings, a rotor provided with armature windings, a commutator connected to said rotor windings, contact devices for delivering polyphase current and direct or single phase current to said motor, means for passing the current delivered by said contact devices through said commutator and said armature and stator windings and for rearranging the rotor and stator windings and causing the current delivered by said contact device to pass through the stator windings without passing it through the rotor windings and means for reversing current through part of the stator windings.

3. An electric motor adapted to operate as a polyphase induction motor and as a commutator motor, comprising in combination a stator and rotor, disassociable windings on the stator and lead wires therefrom, the rotor having a commutator connected to its winding to form a continuously closed circuit commutable winding, brushes thereon, collector rings having polyphase connections with said rotor windings and means for reversing current through part of the stator windings.

4. An electric motor adapted to operate as a polyphase induction motor and as a series commutator motor comprising in combination a stator and rotor, disassociable windings on the stator and lead wires therefrom, and the rotor having a commutator connected to its windings to form a continuous closed circuit commutable winding, brushes thereon and collector rings having polyphase connections with said windings, with a variable rheostat and a switching device, having connections to said winding terminals, commutator brushes, collector rings and rheostat terminals, whereby in one position of said switching device the stator windings are placed in polyphase relation and connected to a source of polyphase currents to form a primary circuit and said rotor collector rings are connected to the rheostat to form a secondary circuit, and in another position of said switch, the disassociable stator windings are connected to form the field magnet of a series motor and are connected in series with the rotor through its commutator and brushes.

5. An electric motor adapted to operate as a polyphase induction motor and as a series commutator motor comprising in combination a stator and rotor, disassociable windings on the stator and lead wires therefrom, the rotor having a commutator connected to its windings to form a continuous closed circuit commutable winding, brushes thereon, collector rings connected to its windings to form inductive polyphase circuits, means for connecting said motor either to a polyphase or single-phase or direct current circuit and for inserting a rheostat in the rotor circuit of said motor acting as an induction motor and in series with said motor acting as a series motor.

6. A motor provided with polyphase field winding, armature windings, a commutator connected to said armature windings, conductors adapted to deliver polyphase or single phase current to said motor, a switch device which in one position delivers current from said conductors through said commutator and said armature windings and field windings and in the other position delivers current from said conductors through said polyphase field windings and cuts off the current from said conductors to said armature windings, and means for reversing current through part of the stator windings.

7. In a motor, stationary polyphase windings, a rotor provided with rotor windings and a commutator connected therewith, contact devices for delivering polyphase, single phase, or direct current, to said motor, means for passing current from said contact devices through said rotor and stator windings and said commutator and for passing current from said devices through said polyphase stationary windings without passing it through the rotor windings to develop a rotating field and means for reversing current through part of the stationary windings.

8. In an electric motor, the combination with armature, commutator and brushes, of a poleless field magnet structure with magnetizing windings and having reversed windings arranged thereon to neutralize armature self-induction and provided with connections, together with a switch for arranging said windings as stator windings for a polyphase motor.

9. In an electric motor, the combination with armature, commutator and brushes, of a poleless field magnet structure with magnetizing windings and having reversed windings arranged thereon to neutralize armature self-induction, connections for operating said motor by single currents collector rings for polyphase currents connected with said armature and connections for operating said motor by polyphase currents.

10. In a polyphase motor a rotor having a uniformly distributed or direct current winding and collector rings connected in polyphase relation, a commutator also connected thereto, a stator having a subdivided ployphase winding, and leads whereby said stator windings may be connected either to form a polyphase winding for the production of a rotating field, or to form field magnet magnetizing and neutralizing windings for the production of fixed poles.

11. In an electric motor, the combination of a poleless field stator magnet structure with segregatable windings, a poleless rotor structure with inlaid windings wound for the same number of magnetic poles and having, with relation to said stator, a definite transforming ratio, a commutator and brushes constructed to constitute said rotor the armature of a series motor, collector rings to constitute said motor one element of a polyphase induction motor, a plurality of lead wires leading from the motor, and a switch whereby said motor may be alternately arranged as a polyphase motor with definite transforming ratio and adapted for operation on circuits of one voltage, and as a series motor with compensating windings adapted for operation on circuits of a different voltage.

In testimony whereof I have signed my name to this specification in the presence of two subscribing witnesses.

KOLOMAN DE KANDO.

Witnesses:
WILLIAM SZÁNFÓE,
LOUIS VANDORY.